Patented Aug. 13, 1940

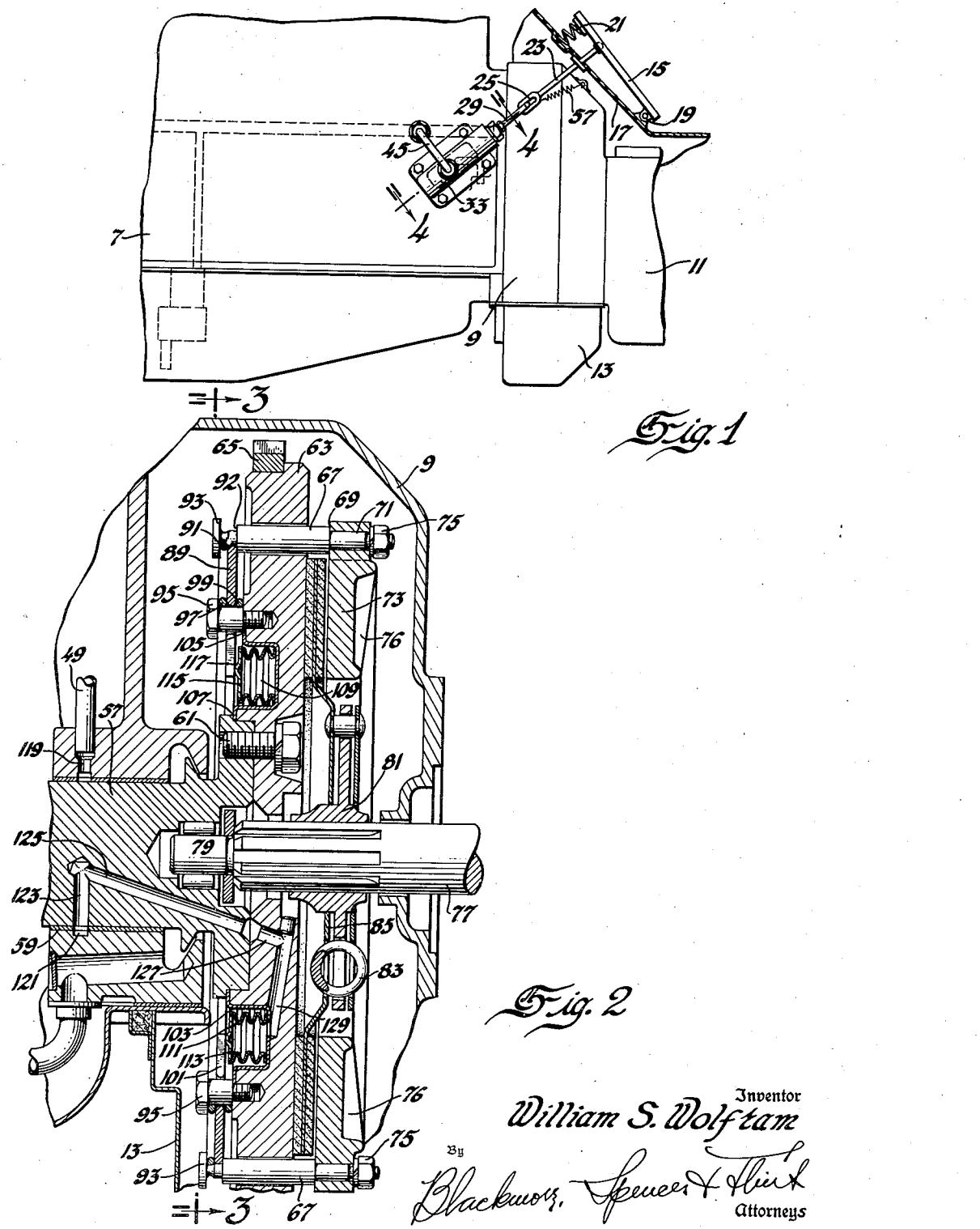

2,211,191

UNITED STATES PATENT OFFICE 2,211,191

CLUTCH

William S. Wolfram, Dayton, Ohio, assignor to General Motors Corporation, Detroit, Mich., a corporation of Delaware Application August 12, 1937, Serial No. 158,630

9 Claims. (Cl. 192—91)

This invention relates to releasable friction clutches such as are used to couple the engine of a motor vehicle with the change speed transmission.

The novel clutch has for one object the elimination of the conventional heavy pedal and linkage and the substitution of light equivalents operable with greatly reduced pedal pressure.

The invention has for another object a reduction in the axial length of the clutch housing, using with such a housing a cover of light weight metal. The changes in the operating mechanism make possible the provision of means for better dampening through the use of unusually large cushioning springs. The novel clutch aims to secure increased torque capacity and improved ventilation. Its construction is such as to avoid the possibility of lubricating medium reaching the plates, and it accomplishes this object, through the elimination of the conventional throw-out collar with its provision for lubrication. The novel clutch insures adequate pressure plate area and a reduction of load on the crankshaft thrust bearing, the latter resulting from the absence of a clutch throw-out load.

Along with the above objects are reduction in cost of manufacture, greater ease of operation and reduction in weight. A more specific object is the accomplishment of the above-mentioned objects by the provision of a simple hydraulic operating mechanism which is valve controlled by the operator and derives its energy from the fluid pump supplying the engine bearings with lubricant.

Other objects and advantages will be understood from the following description

In the drawings:

Figure 1 is a side elevation showing the novel clutch installed in a motor vehicle.

Figure 2 is a transverse section through the clutch.

Figure 3:
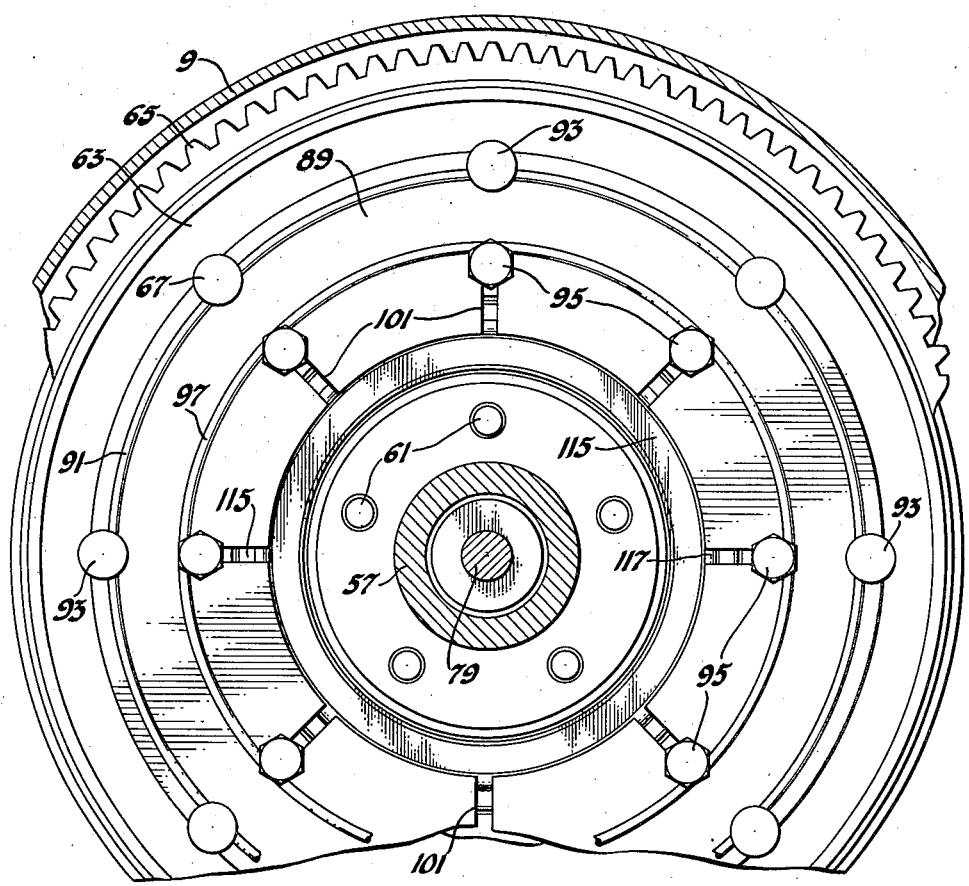
Figure 3 is a view in elevation as seen from line 3—3 of Figure 2.

Referring to the several figures of the drawings, numeral 7 is used to identify the engine of the motor vehicle and 9 and 11 are the clutch housing and change speed housing respectively.

The clutch housing is materially reduced in length from the conventional clutch housing and of less weight, this change being made possible by the clutch operating mechanism to be described below. Access to the interior of the clutch housing is made possible by a light metal cover 13 secured in any convenient way.

Instead of the conventional heavy clutch pedal there is used a light pedal 15 hinged to the floorboard 17 at 19, this pedal being normally held in released position by a spring 21. The pedal carries secured thereto a rod 23 having at its end an opening 25 to receive the bent-over end 27 of a stem 29. The stem 29 passes through a plug 35 threaded into the end of the valve cylinder 33. Within the cylinder 33 is a valve member identified as a whole by numeral 31. This valve member or piston has two heads 37 and 39 between which is a recess 41. At 43 is an inlet opening for pipe 45 which may communicate in any preferred way with the discharge side of the conventional oil pump used for supplying engine bearings with lubricant.

At 47 is an opening for a pipe 49 serving the purpose of transmitting oil to the clutch releasing mechanism as will be explained below. The cylinder 33 may be secured to the engine as shown and has other openings 51, 52 and 53 communicating with the crankcase opening 55 covered by the cylinder. Openings 51 and 53 serve the purpose of preventing any pressure build up between the valve piston and the ends of the cylinder. A spring 57 is attached to the end 27 of stem 29 and to the casing 9. It serves to bias the stem and piston to the position shown in Figure 4 in which the opening 43 for the admission of fluid pressure from the pump is closed by the head 37, and in which opening 52 communicates with recess 41 whereby fluid from the clutch releasing mechanism may return by way of pipe 49 to the crankcase. To release the clutch the pedal is depressed as is customary. In the present case the depressing effort on the pedal is resisted only by light springs. When so depressed openings 43 and 47 are in communication by way of the channel 41 and the pump pressure is transmitted to the clutch releasing mechanism.

In Figure 2 are shown the clutch elements and the mechanism by which the clutch is normally held engaged. This figure also shows the fluid pressure parts by which the clutch is released. In this figure the end of the crankshaft is shown at 57 rotatably supported at 59 in a bearing which, in this case, is an integral part of the housing 9. Fastening means 61 secure the flywheel 63 to the crankshaft flange as usual. The flywheel is equipped with the usual ring gear 65 for engagement with an engine starting pinion. Reciprocable through the flywheel are a plurality of pins 67. The pins have shoulders 69 and reduced parts 71. On the reduced parts is mounted a more or less conventional pressure plate 73, the pressure plate being secured by nuts 75. For cooling purposes the pressure plate may be provided with air circulating fins 76. Driven shaft 77, the shaft which enters the transmission housing 11, is piloted at 79 in the end of the crankshaft and non-rotatably mounted thereon is the hub 81 of the driven clutch disc. The disc proper 85 is yieldingly secured to the hub by cushioning springs 83 of conventional form but of larger than usual size. To drivingly grip the driven plate between the flywheel and the pressure plate there is used a spring of the Belleville disc type. This spring is marked by numeral 89. A metallic ring 91 is positioned by the pins 87, the latter having heads 93 engaged by the ring 91. The Belleville spring 89 engages this ring 91 at its outer periphery. To the flywheel are threaded bolts 95 between the heads of which and the flywheel surface are rings 97 and 99. The spring 89 is received between these rings and has openings to receive the bolts. Radially inward from the region of the bolts 95, the spring preferably is provided with slots 101 which extend to its inner edge. That part of the spring 89 between the circle of pins 67 and the circle of bolts 95 is unbroken. The spring plate is of bowed form when unstressed and must be distorted toward the form of a flat plate in the process of assembly with the pins and bolts. When so assembled it is under tension and its tension in seeking to return to its unstrained condition causes it to press outwardly on ring 91, ring 99 being its reaction abutment. In so functioning it reciprocates pins 67 toward the left (Figure 2) and the driven plate is gripped between the flywheel and the pressure plate.

To overcome the above described clutching action of the spring and to release the pressure of the pressure plate upon the driven plate, the following construction has been adopted. An annular cup 103 is positioned within an annular recess of the flywheel. The cup has a radical outer flange 105 held against the flywheel surface by the bolts 95 and it has an inner flange 107 held clamped between the adjacent faces of the crankshaft flange and the flywheel by the above described fastening means 61. Within the channel of cup 103 is a bellows 109, the bellows being formed by two circular plaited rings 111 and 113 of metal such as brass or the like, the rings being spaced and secured to the base of the cup 103. The bellows is completed by an annular ring 115 to which the plaited rings are secured as by soldering or otherwise. Ring 115 has an annular projecting rib 117 adapted to contact with the inner margin of the spring disc 89.

For the admission of fluid to the bellows the pipe 49 opens to a radial passage 119 in the crankshaft bearing as shown in Figure 2, there being an annular channel 121 in the bearing at the inner end of the radial passage 119.

In the end of the crankshaft there is a radial passage 123 at all times communicating with channel 121. From this radial passage 123 a more or less axial passage 125 communicates with an aligned extension passage 127 in the flywheel and from passage 127 a somewhat radial passage 129 communicates with the bellows 109 by way of an opening in the base of the cup 103.

Figure 4:
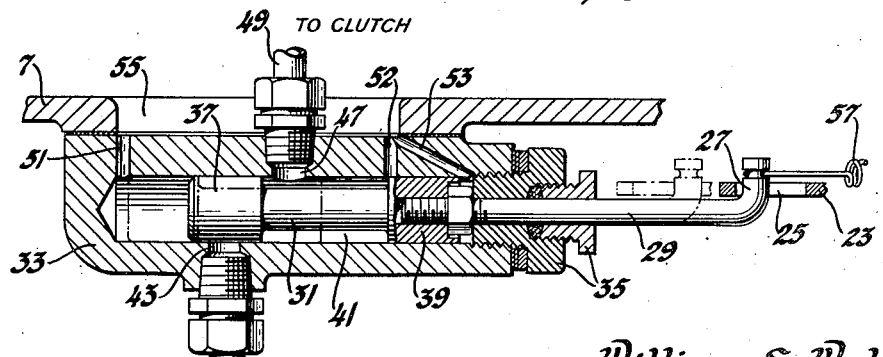
Figure 4 is a section through the control valve, reference being made to line 4—4 of Figure 1.

When the valve is positioned as shown in Figure 4 no fluid from the pump is permitted to flow through the passage to the bellows, but any fluid in the bellows may flow back through the passages indicated into the space between the valve heads 37 and 39 and out of the crankcase through opening 52. When the fluid is thus released, the inherent resiliency of spring 89 acting against a reaction circle at 99 pushes against the pins 87 and effects clutch engagement as explained above. When the clutch is to be released the pedal 15 is depressed. The depression moves the valve parts so that openings 43 and 47 are in communication through the channel 41 and outlet 52 is closed. Thereupon the fluid under pressure passes to the bellows and as it expands ring 115 lifts spring 89 off its abutment ring 99 and rocks it about the ring 97. In so doing the outward pressure on the ring 91 is relieved and the grip of the pressure plate upon the driven plate is released. The outer edge of the spring 89 may then move the pin 67 to the right (Figure 2) and release the clutch, there being a shoulder at 92 on each pin 87 for engagement with the spring 89 whereby the movement of the pins to the right positively moves the pressure plate away from the driven plate.

With the above described arrangements, it will be obvious that the objects of the invention enumerated above are accomplished.

I claim:

1. In a clutch, a first driving member having a frictional face, a second driving member axially spaced from the first driving member, guiding means whereby the second driving member may move toward and from the first driving member, a driven member between and adapted to be gripped by said driving members, yieldable mechanism supported on the side of the first driving member remote from the side having the friction face and from the second driving member, said yieldable mechanism having inherent resiliency and operable to move said second driving member toward the first driving member and hydraulic mechanism also on said remote side of the first driving member to cause said second driving member to move away from the first driving member.

2. The invention defined by claim 1, said yieldable mechanism operable through the instrumentality of said guiding means.

3. In a clutch, a flywheel having a friction face, a pressure plate axially movable toward said flywheel, yieldable mechanism having inherent resiliency to draw said pressure plate toward said flywheel, a driven member between said flywheel and pressure plate, and annular axially expansible hydraulic device concentric with said flywheel located on the side of the flywheel remote from the side having the friction face and operable by expansion upon said yieldable mechanism to permit said pressure plate to move away from said flywheel.

4. The invention defined by claim 3, said pressure plate being on one side of said flywheel and said yieldable mechanism being on the same side of the flywheel as the hydraulic device.

5. In a clutch, a flywheel, a pressure plate axially movable toward said flywheel, yieldable mechanism to draw said pressure plate toward said flywheel, a driven member between said flywheel and pressure plate, an annular axially expansible hydraulic device concentric with said flywheel and operable by expansion upon said yieldable mechanism to permit said pressure plate to move away from said flywheel, said flywheel having an annular groove and said hydraulic device comprising a metallic bellows positioned in said groove.

6. In a clutch, a flywheel, a pressure plate axially movable toward said flywheel, yieldable mechanism to draw said pressure plate toward said flywheel, a driven member between said flywheel and pressure plate, an annular axially expansible hydraulic device concentric with said flywheel and operable by expansion upon said yieldable mechanism to permit said pressure plate to move away from said flywheel, together with guiding means for said pressure plate extending through said flywheel, fulcrum pins carried by said flywheel on the side thereof remote from said pressure plate, said yieldable mechanism consisting of a Belleville spring preferably engaging said guiding means and anchored to said flywheel by said fulcrum pins, said flywheel having an annular groove concentric therewith, said hydraulic device positioned in said groove and operable upon the radially inner margin of said yielding means.

7. In a clutch, a flywheel having a friction face, a pressure plate, a driven member between and engaged by said friction face and pressure plate, yieldable mechanism to move said pressure plate towards said flywheel into clutch engaging position, hydraulic means having a movable part directly to engage and move said yieldable mechanism whereby the yieldable mechanism releases said pressure plate from clutch engaging position, said pressure plate being located on one side of said flywheel and said yieldable mechanism and hydraulic means being located on the side of the flywheel remote from said friction face.

8. In a clutch, a flywheel, a pressure plate, a driven member therebetween, yieldable mechanism to move said pressure plate towards said flywheel into clutch engaging position, hydraulic means having a movable part to engage and move said yieldable mechanism whereby the yieldable mechanism releases said pressure plate from clutch engaging position, said pressure plate being on one side of the flywheel, guide pins secured to said pressure plate and extending through the flywheel, said yieldable mechanism being on the other side of said flywheel, anchored thereto and engaging said pins, said hydraulic means also being upon said other side of the flywheel and operable upon said yieldable mechanism to stress the same and relieve the pressure plate from the influence of the yieldable mechanism.

9. The invention defined by claim 7, said yieldable mechanism also operable in response to said hydraulic means to positively move said pressure plate to clutch releasing position.

WILLIAM S. WOLFRAM.